United States Patent [19]
Takii et al.

[11] Patent Number: 4,766,866
[45] Date of Patent: Aug. 30, 1988

[54] INTAKE SYSTEM FOR ENGINE

[75] Inventors: Osamu Takii; Hironobu Ukei, both of Hamamatsu; Keiji Fujikawa, Iwata, all of Japan

[73] Assignee: Yamaha Hatsudoki Kabushiki Kaisha, Itawa, Japan

[21] Appl. No.: 32,021

[22] Filed: Mar. 30, 1987

[30] Foreign Application Priority Data

Mar. 31, 1986 [JP] Japan .................................. 61-72738

[51] Int. Cl.⁴ ............................................. F02B 15/00
[52] U.S. Cl. ................................. 123/432; 123/90.23; 123/90.27
[58] Field of Search .................... 123/432, 90.23, 90.27

[56] References Cited

U.S. PATENT DOCUMENTS

| | | | |
|---|---|---|---|
| 4,317,438 | 3/1982 | Yagi et al. | 123/432 |
| 4,612,903 | 9/1986 | Urabe et al. | 123/432 |
| 4,617,896 | 10/1986 | Yoshikawa | 123/432 |

Primary Examiner—E. Rollins Cross
Attorney, Agent, or Firm—Ernest A. Beutler

[57] ABSTRACT

A compound induction system for an internal combustion engine embodying at least two intake passages serving each combustion chamber. A throttle valve arrangement is incorporated for controlling the flow through one of the intake passages and this throttle valve is opened in a staged sequence so that that induction passage will not act as a side branch resonant chamber under any experienced running conditions.

10 Claims, 4 Drawing Sheets

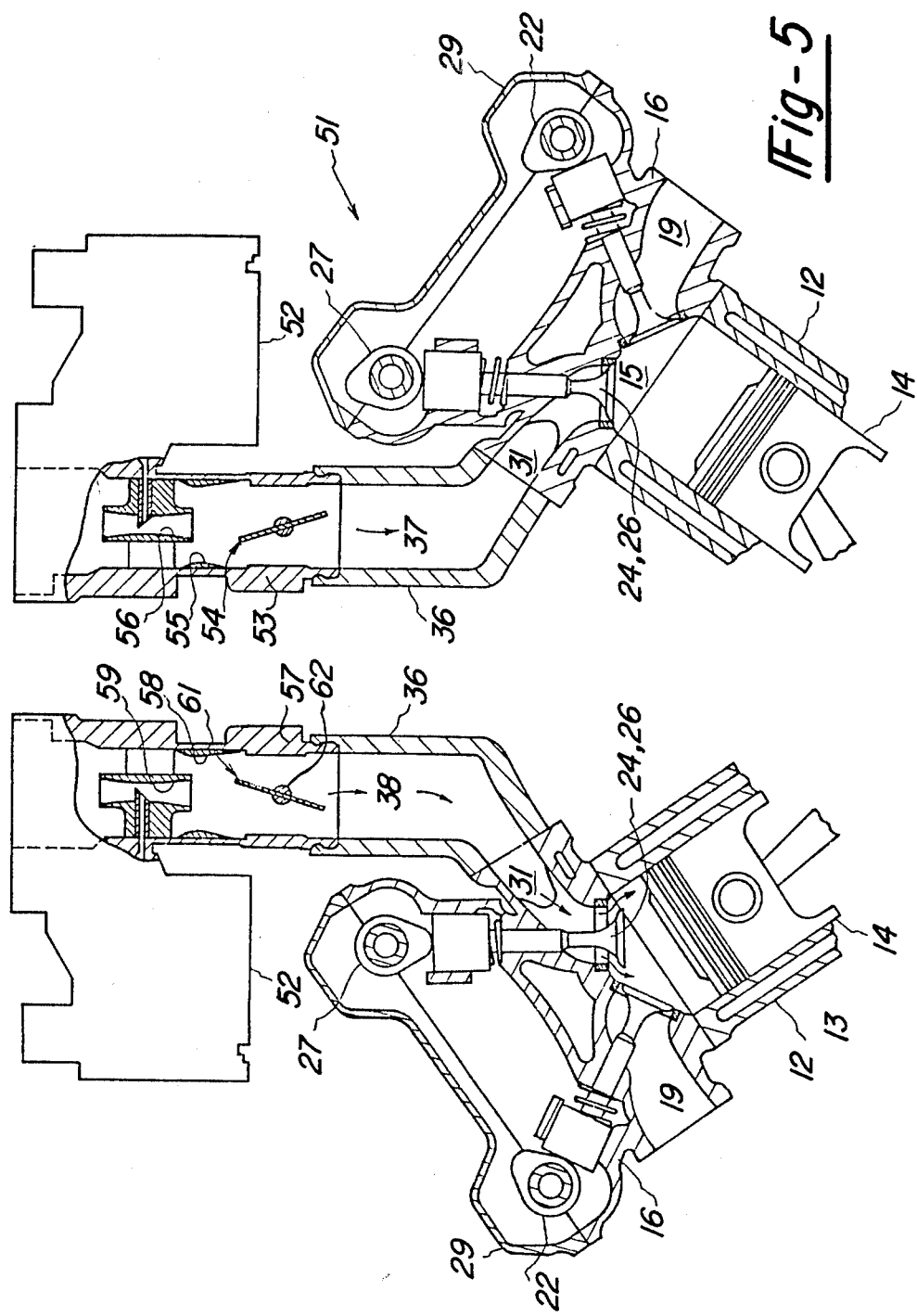

INTAKE SYSTEM FOR ENGINE

BACKGROUND OF THE INVENTION

This invention relates to an intake system for engines and more particularly to an improved high efficiency intake system for an engine that permits maximum power output to be achieved with good running under mid and low range conditions.

In order to offset the disadvantages of engines having only a single induction passage serving each combustion chamber and the compromises dictated thereby, it has been proposed to provide an induction system for an internal combustion engine wherein each combustion chamber is served by a plurality of induction passages. In order to improve the running under partial loads, it has been the practice to provide a throttle valve in one of the induction passages. This throttle valve is operated so that it remains closed during a substantial portion of the engine running and opens only at the high end of the engine power curve. Such devices provide generally good running at high outputs and at low outputs. However, it has been noticed that the performance of engines having such dual induction systems with separate throttle controls at part throttle and part load is less than satisfactory. That is, it has been found that this type of induction system results in a torque curve for the engine that has a flat spot or, even worse, a valley in the torque curve at mid range running.

The inventors have discovered that a reason for this unfavorable performance phenomena is that the area of the induction passage in which the throttle valve is positioned functions as a side branch resonance chamber during the running conditions when the throttle valve is closed. Thus, even though there is no or substantially little air flow through this particular induction passage, during certain engine running conditions, the resonance chamber adversely affects the induction into the combustion chamber through the primary intake passage. As a result, the induction efficiency of the engine under this running condition is poor and the part range performance suffers.

It is, therefore, a principal object of this invention to provide an induction system for an internal combustion engine in which high power outputs are possible and in which part range running performance is significantly improved.

It is a further object of this invention to provide a high efficiency induction system for an internal combustion engine.

It is a further object of this invention to provide an induction system for an internal combustion engine of the type including plural intake passages serving each combustion chamber of the engine and wherein induction system resonance is avoided.

SUMMARY OF THE INVENTION

This invention is adapted to be embodied in an induction system for an engine having a variable volume chamber and first and second intake passages serving the variable volume chamber. Throttle valve means are provided for controlling the communication of the second intake passage with the chamber and this throttle valve means is disposed upstream of the point where the second intake passage communicates with the chamber for defining a volume that communicates with the chamber. Means are provided for opening the throttle valve means in a staged sequence for precluding said volume from acting as a side branch resonance chamber during at least some phases of engine running.

BRIEF DESCRIPTION OF THE DRAWINGS

FIG. 5 is a cross-sectional view taken along the line 5—5 of FIG. 4.

DETAILED DESCRIPTION OF THE PREFERRED EMBODIMENTS

Figure 1:
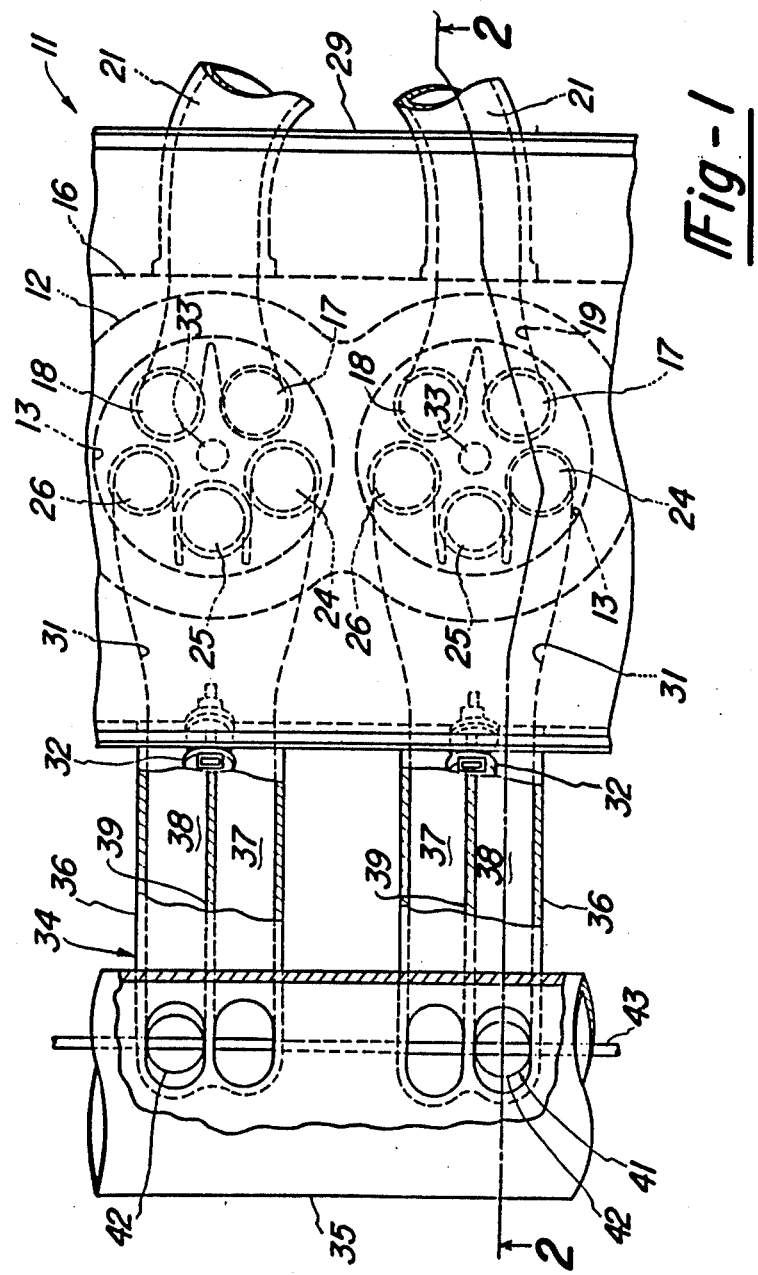
FIG. 1 is a top plan view of a portion of an internal combustion engine having an induction system constructed in accordance with a first embodiment of the invention.
Figure 2:
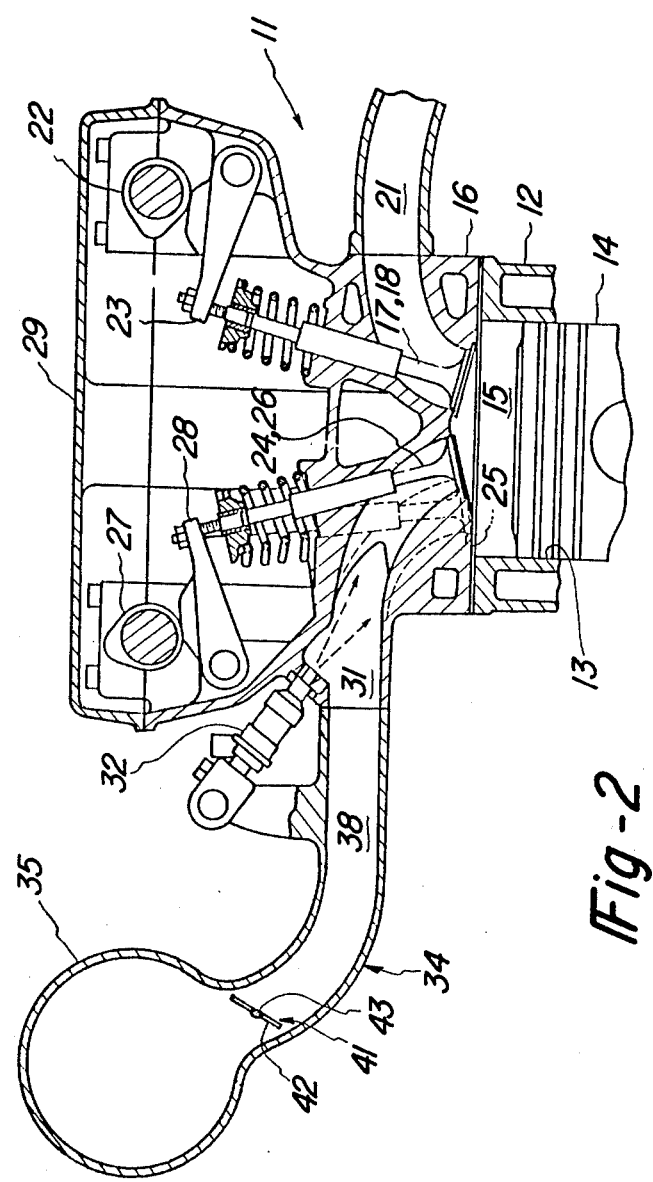
FIG. 2 is a cross-sectional view taken generally along the line 2—2 of FIG. 1.

Referring first to FIGS. 1 and 2, an internal combustion engine constructed in accordance with an embodiment of the invention is identified generally by the reference numberal 11. In the illustrated embodiment, only a portion of the engine is depicted, that dealing primarily with the induction system of the engine since this is the area where the invention resides.

The engine 11 includes a cylinder block 12 in which a plurality of cylinder bores 13 are formed. In this embodiment of the invention, the engine 11 is of the inline type. As will become apparent as this description proceeds, however, the invention is susceptible of use in engines of other configurations and, in fact, of engines other than those of the reciprocating type. Pistons 14 are reciprocally supported in each of the cylinder bores 13 and are connected by means of connecting rods (not shown) to an output shaft in a known manner.

A recess 15 is formed in the cylinder block 12 above the head of the pistons 14 and this recess extends into a cavity formed in a cylinder head 16 and at times will be referred to as the combustion chamber. The cylinder head 16 is affixed in a known manner to the cylinder block 12.

The engine 11 is provided with an exhaust system for each combustion chamber 15. This exhaust system includes a pair of exhaust valves 17 and 18 that lie on one side of a plane passing through the axis of the cylinder bore 13 and extending parallel to the output shaft of the engine. The exhaust valves 17 and 18 control the flow of exhaust gases from the combustion chamber 15 into a siamesed exhaust port 19 that extends through one side of the cylinder head 16 and to which an exhaust manifold 21 is affixed for delivering the exhaust gases to the atmosphere through a suitable exhaust system (not shown).

The exhaust valves 17 and 18 are operated in unison from an overhead mounted camshaft 22 via a rocker arm assembly 23. The rocker arm assembly 23 may be of the bifurcated type so as to operate both valves 17 and 18 from a single rocker arm. Alternatively, the valves 17 and 18 may each be operated by a separate rocker arm.

On the side of the cylinder head opposite to the exhaust valves 17 there are provided a plurality of intake valves. In this embodiment, there are incorporated three intake valves 24, 25 and 26. The intake valves 24, 25 and 26 are located generally in the manner described in U.S. Pat. No. 4,624,222, issued Nov. 25, 1986. Reference may be had to that patent for the configuration and orientation of the intake valves 24, 25 and 26. It should be understood, however, that the location of the intake valves 24, 25 and 26 and their orientation is chosen so as to permit a compact combustion chamber configuration as is disclosed in said patent.

The intake valves 24, 25 and 26 are operated from an overhead camshaft 27 via a rocker arm assembly 28. The rocker arm assembly 28, like the rocker arm 23, may be of the forked type so as to have a separate arm to operate each individual intake valve. Alternatively, separate rocker arms may be provided for each of the valves or they may be paired in any suitable manner.

The camshafts 22 and 27 are driven in any suitable manner and are contained within a cam tower 29 that is affixed in a known manner to the cylinder head assembly 16.

The cylinder head 16 is provided with a single intake passage 31 for each combustion chamber 15 and each set of intake valves 24, 25 and 26. Of course, the intake passage 31 separates and provides individual runners that terminate at the individual valve seats of the intake valves 24, 25 and 26.

A fuel injection nozzle 32 is mounted in the cylinder head 16 and sprays into each intake passage 31 in a generally central location so that the fuel charge will be delivered to the engine combustion chambers 32 through each of the intake valves 24, 25 and 26 in a generally equal fashion.

A single spark plug 33 is centrally positioned in each of the combustion chambers 15. The spark plugs 33 are mounted in the cylinder head 16 and are fired in any suitable manner.

An intake manifold, indicated generally by the reference numeral 34, is provided for delivering an air charge to the cylinder head intake passages 31. The manifold 34 has a plenum chamber 35 that receives air through a suitable atmospheric air inlet in which a main throttle control valve (not shown) is positioned. This main throttle control valve controls the total amount of air flowing into the plenum chamber 35 and, accordingly, to the engine. There may be provided in either the plenum chamber or at its inlet an air filtering device (not shown) and also an air flow measuring device for measuring the amount of air flow into the engine.

The manifold 34 is provided with a plurality of individual runners 36 that extend from the plenum chamber 35 to respective of the cylinder head intake passages 31. The runners 34 are divided into a primary intake passage 37 and a secondary intake passage 38. In the illustrated embodiment, the primary passages 37 and secondary passages 38 have approximately the same effective cross-sectional area. It is to be understood, however, that the invention may be employed with engines having different cross-sectional areas for the individual passages 37 and 38. The passages 37 and 38 are separated from each other throughout the length of the runners 34 by means of dividing walls 39. However, the dividing walls 39 terminate at the cylinder head intake passages 31 so that the flow through the passages 37 and 38 will combine immediately adjacent the intake valves 24, 25 and 26.

A throttle valve assembly 41 is provided that comprises a plurality of individual throttle valves 42 that are affixed to a common throttle valve shaft 43. It should be noted that the throttle valves 42 are only located in the secondary induction passages 38 and therefore control the flow only through these induction passages.

The construction of the engine 11 as thus far described may be considered to be conventional. In accordance with such conventional engines, it has been the practice to maintain the throttle valve assembly 41 in a fully closed position until the engine is operating near its maximum power output. At this time, the throttle valves are opened in a fairly rapid manner from their fully closed position to a fully opened position. As may be seen in FIG. 3, this results in a torque curve that has a valley or dip at mid range running conditions. The torque curve of such a conventional engine is shown in the broken line view and it will be seen that a mid range, the torque curve is depressed and may result in less than desired mid range performance.

The inventors have found that this mid range performance phenomenon results from the fact that the volume of the intake passages 38 between the throttle valves 42 and the intake valves which they serve (24 and 25) acts as a side branch resonance chamber during the opening and closing of the intake valves at these running conditions. The reason for this is that the volume of this area cooperates with the combustion chamber so as to create a resonant frequency which interferes with the induction through the primary intake passage 37 and adversely affects the charging of the combustion chamber 16.

Figure 3:
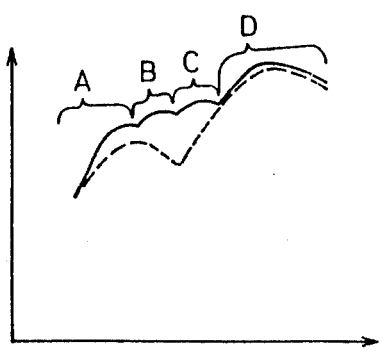
FIG. 3 is a torque speed curve showing the comparison between a conventional engine, as shown by the broken line curve, and an engine constructed in accordance with the embodiment of FIGS. 1 and 2, as shown by the solid line curve.

In accordance with the invention, therefore, the throttle valves 42 are opened in a staged sequence so as to improve the torque curve by permitting sufficient air flow that the volume of the passages 38 does not act as such a side branch resonance chamber. The effect of these staged throttle valve opening is shown in FIG. 3 wherein the torque curve of an engine operating on this principle is shown in sold lines. It will be noted that in an illustrated embodiment of the invention, the engine idles at approximately 800 rpm and has a peak speed of about 7,000 rpm. As shown in the curve section A, the throttle valves 42 are maintained in a closed position up until about 25,000 rpm. At this time, the throttle valves 42 are opened either by means of a linkage system or a vacuum motor to approximately one-quarter full opening. As a result, the torque curve of the engine is improved and this condition is maintained until the engine reaches about 4,000 rpm. At this time, the throttle valves 42 are opened to approximately one-half opened condition and the torque curve follows the curve B to improve the torque curve under these running conditions. Once the engine reaches approximately 5,000 rpm, the throttle valves 42 are fully opened and the torque curve generally follows that of a conventional engine of this general type. It should be noted that the torque curve of FIG. 3 is a full throttle torque curve and that is one which is generated by holding the main throttle valves of the engine wide open. It should be readily apparent that the staged sequence opening of the throttle valves 42 significantly improves the torque curve of the engine.

Figure 4:
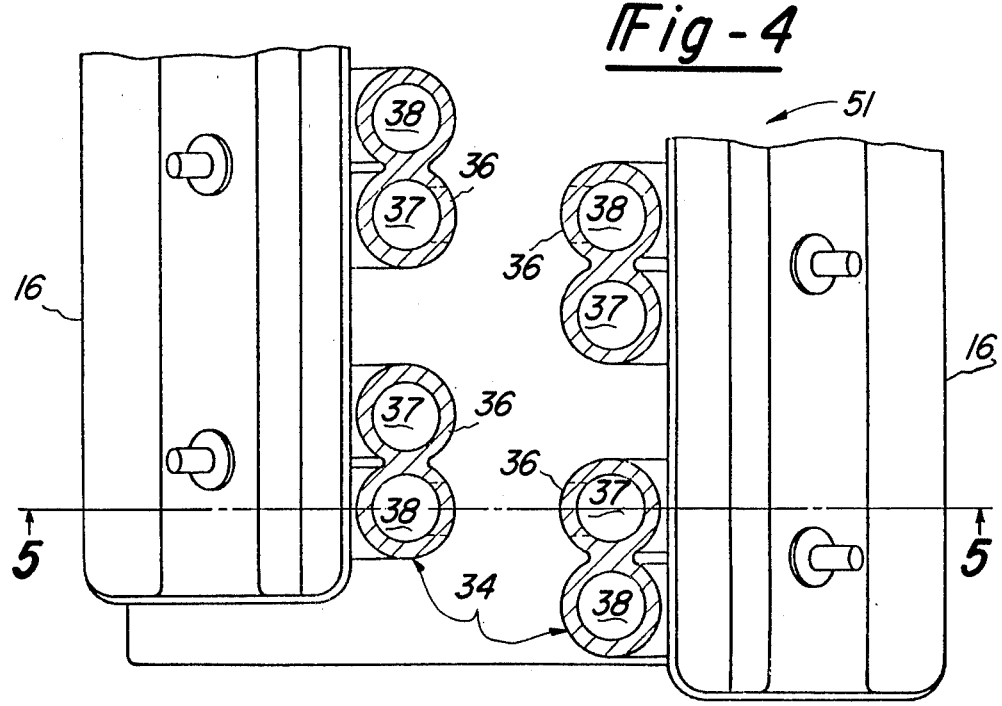
FIG. 4 is a partial top plan view, with portions broken away, of an internal combustion engine constructed in accordance with a second embodiment of the invention.

FIGS. 4 and 5 show the adaptation of this principle to an engine of the V type configuration and one in which the charge is provided by carburetors rather than fuel injection nozzles. In addition, this engine, which is indicated generally by the reference numeral 51, employs four valves per cylinder rather than five valves per cylinder as in the previously described embodiment. As such, the intake and exhaust valves are opened by the camshafts directly rather than through rocker arms. Since the basic components of the engine, except as has been noted, are the same as the previously described embodiment, those components have been identified by the same reference numerals and will be described again only generally.

Since the engine 51 is of the V type, the cylinder block 12 is comprised of two angularly disposed banks in which the cylinder bores 13 are formed. In this embodiment, as already noted, the engine is provided with only two intake valves 24, 26 and these are served by the cylinder head intake passages 31. Each bank of the V is supplied with a charge from the respective manifold runners 36, there again being one runner per combustion chamber 15. Again, the runners 36 are divided into primary intake passages 37 and secondary intake passages 38.

In accordance with this embodiment, each manifold runner 36 is supplied with a fuel/air charge from a respective two-barrel carburetor 52. The carburetors 52 have a primary barrel 53 in which a manually operated throttle valve 54 is positioned. The throttle valve 54 is positioned downstream of a venturi throat 55 and of a main fuel discharge nozzle 56. The various primary flow circuits of the carburetor barrel 53 are not illustrated as this type of carburetor is well known to those skilled in the art. The throttle valves 54 are all coupled together so as to be operated in unison by means of an appropriate operator control. The primary barrels 53 serve the primary intake passages 37 of each of the runners 36.

Each carburetor 52 is provided with a secondary barrel 57 that serves the second manifold intake passages 58. A venturi section 58 is provided in the barrel 57 and a boost fuel discharge nozzle 59 is disposed thereabove. A throttle valve 61 is carried on a throttle valve shaft 62 above the boost nozzle 59 for controlling the flow through the barrel 57 and manifold passages 38.

As with the previously described embodiment, the throttle valves 54 and 61 are operated in a staged sequence so that the throttle valves 61 are held closed up until approximately one-quarter engine speed and then are opened to a one-quarter opening. At approximately half maximum engine speed, the throttle valves 61 are opened half way and at approximately two-thirds of maximum engine speed, the throttle valves 61 are opened all the way. As a result, this engine will exhibit a torque curve similar to that of FIG. 3 and will not have the poor mid range running as with the prior art type of arrangements.

It should be understood that the two embodiments of the invention illustrated and described are only typical of those in which may be employed in connection with the invention. Various other changes and modifications may be made without departing from the spirit and scope of the invention, as defined by the appended claims.

What is claimed is:

1. In an induction system for an internal combustion engine having a variable volume chamber, first and second intake passages serving said variable volume chamber, throttle valve means for controlling the communication of said second intake passage with said chamber, said throttle valve means being disposed upstream of the point where said second intake passage communicates with said chamber for defining a volume communicating with said chamber, and means for opening said throttle valve means in response to a running condition of the engine under which said volume would act as a side branch resonator if said volume were closed for precluding said volume from acting as a side branch resonator during at least some phases of engine running.

2. In an induction system as set forth in claim 1 wherein the staged opening of the throttle valve means comprises opening from a closed position to a part throttle position and opening from the part throttle position to a fully opened position.

3. In an induction system as set forth in claim 2 wherein there is a three stage opening of the throttle valve means from a closed position to a partially opened position, from that partially opened position to a more fully opened position and from the more fully opened position to a wide open position.

4. In an induction system as set forth in claim 1 wherein the induction passages open into the chambers regardless of the opening of the throttle valve means.

5. In an induction system as set forth in claim 4 wherein the intake passages open into the variable volume chambers through intake ports.

6. In an induction system as set forth in claim 5 wherein the staged opening of the throttle valve means comprises opening from a closed position to a part throttle position and opening from the part throttle position to a fully opened position.

7. In an induction system as set forth in claim 6 wherein there is a three stage opening of the throttle valve means from a closed position to a partially opened position, from that partially opened position to a more fully opened position and from the more fully opened position to a wide open position.

8. In an induction system as set forth in claim 5 further including intake valves controlling the flow through the ports.

9. In an induction system as set forth in claim 8 wherein the staged opening of the throttle valve means comprises opening from a closed position to a part throttle position and opening from the part throttle position to a fully opened position.

10. In an induction system as set forth in claim 9 wherein there is a three stage opening of the throttle valve means from a closed position to a partially opened position, from that partially opened position to a more fully opened position and from the more fully opened position to a wide open position.

* * * * *